Figure 1:
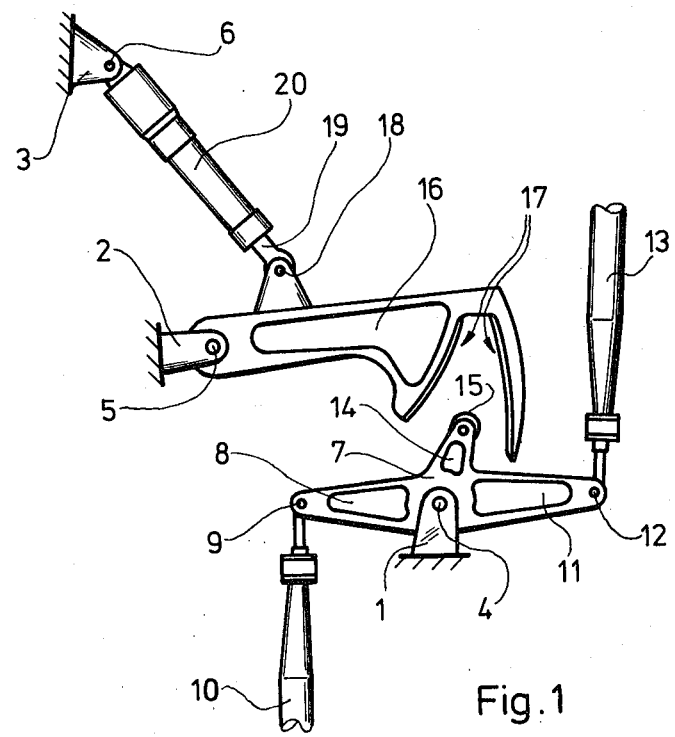

United States Patent [19]

Mootz

[11] 4,385,741
[45] May 31, 1983

[54] AIRCRAFT STEERING MECHANISM

[75] Inventor: Wolfgang Mootz, Plaisance du Touch, France

[73] Assignee: Messerschmitt-Boelkow-Blohm GmbH, Munich, Fed. Rep. of Germany

[21] Appl. No.: 234,255

[22] Filed: Feb. 13, 1981

[30] Foreign Application Priority Data

Feb. 19, 1980 [DE] Fed. Rep. of Germany ....... 3006087

[51] Int. Cl.³ ...................... B64C 13/16; B64C 13/24
[52] U.S. Cl. ..................................... 244/230; 74/526; 244/75 R; 244/76 R
[58] Field of Search ................. 244/75 R, 76 R, 76 B, 244/203, 220, 221, 224, 229, 230, 232; 74/516, 526

[56] References Cited

U.S. PATENT DOCUMENTS 2,859,926 11/1958 Westbury ......................... 244/76 R
2,876,968 3/1959 Chaplin et al. ................... 244/76 R
2,940,332 6/1960 Teague ................................. 74/516

FOREIGN PATENT DOCUMENTS 730010 5/1955 United Kingdom ................ 244/230
763356 12/1956 United Kingdom ............. 244/76 B
763381 12/1956 United Kingdom ............. 244/76 B Primary Examiner—Charles E. Frankfort
Attorney, Agent, or Firm—W. G. Fasse; D. H. Kane, Jr.

[57] ABSTRACT

The present aircraft steering mechanism provides different steering characteristics for different aircraft speeds, especially at low speeds on the one hand and at high speeds on the other hand. For this purpose the steering mechanism, which is operatively interposed between a control input and a controlled member, such as a rudder or flap, forms a transmission system including a walking-beam type lever with a free-end member and a forked member. The forked member is movable relative to the free-end member in response to a flight parameter, such as the dynamic pressure, whereby the free-end member dips more or less into the forked member. Thus, the excursion of the free-end member is increasingly more limited as the speed of the aircraft increases. The see-saw type lever forms a control input and a control output and the degree of excursion is determined by the extent to which the free-end member dips into the forked member.

7 Claims, 2 Drawing Figures

AIRCRAFT STEERING MECHANISM

CROSS-REFERENCE TO RELATED APPLICATION

The present application corresponds to German Patent Application P 3,006,087.8-22; filed in the Federal Republic of Germany on Feb. 19, 1980. The priority of said German Patent Application is hereby expressly claimed.

BACKGROUND OF THE INVENTION

The invention relates to a steering mechanism, especially for an aircraft and is capable of providing a different control characteristic in response to different control parameters, for example, to provide larger excursions of a controlled member, such as a rudder or flap when the aircraft is flying at relatively slow speeds and to reduce these excursions when the aircraft is flying at high speeds.

A steering mechanism of the just described type is disclosed in German Patent Publication (DE-AS) 1,225,502. The known mechanism comprises substantially two lever arms of about equal length. One end of each lever arm is interconnected with the respective end of the other lever arm by a common journal or pivot joint so that the angular position of the two lever arms relative to each other is adjustable.

The known mechanism is so constructed that the translation factor is variable between a maximum value and zero. The known mechanism may be used in connection with the steering rods for a control surface as well as in connection with the steering rods of a control nozzle of glider airplanes equipped with a jet control. In such glider airplanes the effectiveness of the aerodynamic rudder steering control which diminishes with the decreasing aircraft speed, is compensated by the correspondingly increasing effectiveness of the jet steering control. Said prior structure constitutes a good solution for the problem of how to compensate for the diminishing effectivenes of the steering surfaces of an aircraft when the latter reduces its speed. However, the known structure comprises a large number of bearing points and levers whereby it becomes trouble-prone. Additionally, it is difficult to construct the known mechanism as a so-called redundant steering control mechanism comprising duplicated control means.

OBJECTS OF THE INVENTION

In view of the above it is the aim of the invention to achieve the following objects singly or in combination:

to construct a steering mechanism of the type described above in which the number of support or pivot points has been reduced along with the number of required control levers;

to construct the steering mechanism in such a manner that it may be embodied as a so-called redundant steering mechanism in which at least the most important steering components are provided in duplicate without necessarily increasing the number of pivot points;

to provide a steering mechanism which is generally applicable for translating a control input into a control output in response to control parameters which define the translation factor; and to construct the steering mechanism in such a manner that it is compatible with different types of control inputs as well as with different types of control outputs or controlled means.

SUMMARY OF THE INVENTION

The steering mechanism according to the invention is characterized in that the control transmission system comprises a tiltable lever of the walking-beam type which includes a free-end stop member, the stop of which is determined in response to a control parameter, for example, the dynamic pressure head measured during the flight of an aircraft. For this purpose the stop cooperates with a fork, the prongs of which form a wedge-shaped space into which the stop member reaches to a larger or smaller extent, depending on said control parameter. Thus, it is for example possible to limit the excursion of the stop member to a larger or to an increasing extent with the increasing speed of the aircraft.

The important advantage of the invention and its advance in the art as compared to the above described prior art structure is seen in its simple structure, in its assured function, and in its ability to be constructed as a redundant steering mechanism. A further advantage is seen in that the invention may be used for transmitting control forces in many different environments, but particularly in that it may be used to control all steering surfaces of an aircraft in order to increase the effectiveness of such steering surfaces during slow speed flight.

BRIEF FIGURE DESCRIPTION

Figure 2:
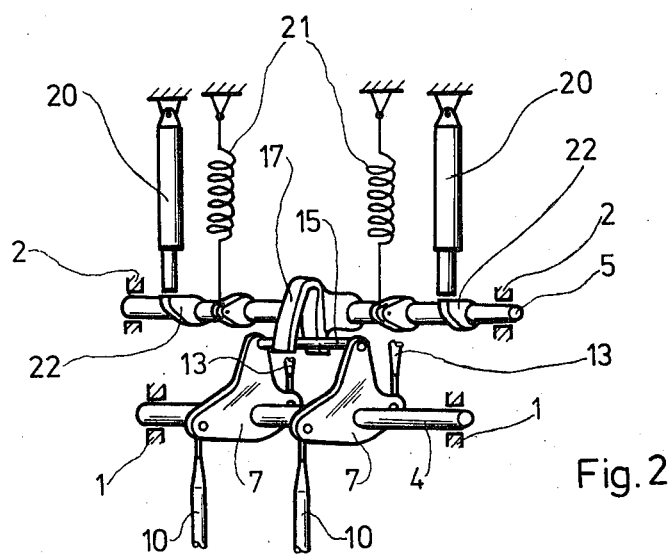

In order that the invention may be clearly understood, it will now be described by way of example, with reference to the accompanying drawings, wherein:

FIG. 1 shows a side view of the basic features of a steering mechanism according to the invention; and FIG. 2 is a perspective view of a second embodiment according to the invention comprising a redundant feature.

DETAILED DESCRIPTION OF PREFERRED EXAMPLE EMBODIMENTS AND OF THE BEST MODE OF THE INVENTION

FIG. 1 shows a steering mechanism, for example, for the rudder assembly of an aircraft or a speedboat. Three support bearings 1, 2, and 3 are rigidly secured to the body of the craft not shown. Each support bearing 1, 2, and 3 provides a journal bearing, for example, in the form of a journal shaft 4, 5, and 6 respectively. A walking-beam type lever 7 is journalled to the shaft 4 for a see-saw type of movement. The walking-beam lever 7 has a control input lever arm 8 and a control output lever arm 11 as well as a free-end lever 14 provided with a stop element 15 at the free end thereof. A control input means, for example, in the form of a rod 10 is pivotally secured to the free-end of the lever 8 as shown at the pivot 9. A control output means such as a rod 13 is pivoted at 12 to the free-end of the output lever arm 11.

A parameter responsive lever 16 is pivoted about the journal shaft 5 at one of its ends and carries at its opposite end a fork with two prongs 17 forming a wedge shaped space between these prongs. The lever 16 is pivoted at 18 to a piston rod 19 of a piston cylinder adjustment member 20 which in turn is journalled with its opposite housing end to the journal shaft 6. The arrangement is such, that the position of the space between the prongs 17 relative to the stop element 15 at the free-end of the lever 14 is determined by the adjustment member 20 in response to a control parameter.

The control input rod 10 is connected to the pedals operated for example, by the pilot. The rod 13 is operatively connected to the means which control the controlled member, such as a rudder or flap surface not shown, for moving such control surface. At low flight speeds, for example, the rudder excursions must be relatively large in order to assure the required rudder effect even at the low dynamic pressure head resulting at low flight speeds. Thus, in the relative position shown between the fork and the element 15, the walking-beam 7 is permitted to provide for larger excursions. On the other hand, when the element 15 dips deep into the wedge-shaped space between the prongs 17, at high speeds, then the excursions will be more limited. Thus, the larger steering effect of the steering surfaces at higher speeds are utilized for correspondingly reducing the steering excursions required for performing any given flight maneuver. If the steering excursions at high speeds would be too large, excessive loads would be introduced into the supporting structure to which the support members 1, 2, and 3 are secured. The invention avoids overloading the supporting structure in that the lever 16 is controlled in response to a signal derived from the dynamic pressure head and applied to the adjustment member 20 which thus turns the lever 16 clockwise in response to increasing flight speeds. The structure is such, that the stop element 15 always remains within the wedge shaped space defined by the prongs 17 of the fork at the end of the lever 16. Thus, the control movement of the rods 10 and 13 is increasingly more limited with increasing flight speed to limit the excursions in both directions from the neutral position of the walking-beam 7 due to the contact between the elements 15 and 17.

The apparatus according to the invention is compatible with all types of control transmissions between the control output lever arm 11 and the controlled member. Instead of the mechanical connecting rods it would be possible to employ hydraulic or electrical control transmission means. Even fiber optical control transmission means could be employed. The adjustment member 20 may, for example, be an electrical adjustment member such as a resistor with a sliding contact which could replace the illustrated hydraulic or pneumatic adjustment member.

Further, the fork prongs 17 could, for example, be directly secured to the free-end of the piston rod 19.

FIG. 2 illustrates an embodiment of the invention with a redundant feature so that the components which participate in the effectiveness of the steering mechanism are provided in duplicate. Such an embodiment is provided for increasing the reliability and redundant steering mechanism are known as such in the art. However, prior art structures are, as mentioned above, rather complicated.

The embodiment of FIG. 2 comprises the elements 1 to 20 mentioned above with reference to FIG. 1 and cooperating as described. Additionally, FIG. 2 discloses two tension springs 21 pulling the shaft or axle 5 with its cam members 22 against the free-end of the piston rod of the adjustment members 20. The lever 16 with the fork prongs 17 is secured to the shaft 5 and can be operated either with the left hand adjustment member 20 or with the right hand adjustment member 20 through the respective cam member 22, whereby the springs 21 provide the respective reset force.

Similarly, the walking-beam member 7 is provided in duplicate and the stop element 15 in the form of a rod interconnects the free ends of the walking-beams 7 for cooperation with the prongs 17.

The adjustment member 20 which is not participating in the positioning of the fork prongs 17, for example, because it is defective, is not subject to any force so that the function of the mechanism may be maintained by the respective other adjustment member without any hindrance by the defective member. Even in this redundant embodiment, the number of components is surprisingly low and the entire structure is remarkably simple. Incidentially, instead of using rods 10, 13 it would be possible to employ cable pull means or the like.

The present steering mechanism is suitable for aircraft of any type including glider type aircraft. In this context it would be possible to operate a jet steering nozzle in response to a predetermined position of the lever 16 which position is determined by the adjustment member 20.

Although the invention has been described with reference to specific example embodiments, it will be appreciated, that it is intended, to cover all modifications and equivalents within the scope of the appended claims.

What is claimed is:

1. A steering mechanism for transmitting a control input to a controlled means in response to given control parameters, comprising walking-beam means, control input means operatively connected to said walking-beam means, control output means operatively connected to said walking-beam means for transmitting a control force to said controlled means, a free-end stop member operatively secured to said walking-beam means, fork means having fork prongs operatively arranged for cooperation with said free-end stop member so that the stop member may reach with its free end into a wedge shaped space formed between the fork prongs, and control parameter input means operatively connected to said fork means for moving said fork means in response to said control parameters whereby said free-end member dips into said wedge shaped space to an extent determined by said control parameters so that said walking-beam means operates as a continuous control input translator, the translation characteristic of which varies in accordance with said control parameters, and wherein said walking-beam means comprises two lever arms tiltable about a common journal axis, said control input means comprising first rod means pivoted to one of said lever arms, said control output means comprising second rod means pivoted to the other lever arm, said free-end stop member comprising a further lever arm operatively connected at one end to said two lever arms of said walking beam means, and wherein said fork means comprise fork lever means pivoted at one end thereof and carrying said fork prongs at the opposite end thereof, said control parameter input means comprising adjustment means operatively connected to said fork lever means and having a length which is variable in response to said control parameters.

2. The mechanism of claim 1, wherein said controlled means comprise a steering member of an aircraft, and wherein said fork means are controlled in response to the dynamic pressure head, whereby the translational excursion of said walking-beam means is limited in response to the increasing speed of the aircraft.

3. The mechanism of claim 1, wherein said control parameter input means comprise a spring damping characteristic.

4. The mechanism of claim 1, wherein said stop member comprises a stop element (15) at its free end for cooperation with said fork means.

5. A steering mechanism for transmitting a control input to a controlled means in response to given control parameters, comprising walking-beam means, control input means operatively connected to said walking-beam means, control output means operatively connected to said walking-beam means for transmitting a control force to said controlled means, a free-end stop member operatively secured to said walking-beam means, fork means having fork prongs operatively arranged for cooperation with said free-end stop member so that the stop member may reach with its free end into a wedge shaped space formed between the fork prongs, and control parameter input means operatively connected to said fork means for moving said fork means in response to said control parameters whereby said free-end member dips into said wedge shaped space to an extent determined by said control parameters so that said walking-beam means operates as a continuous control input translator, the translation characteristic of which varies in accordance with said control parameters, wherein said walking-beam means comprise two walking-beam members, each having a free-end stop member, said control input means comprising two first rod members pivoted to the respective walking-beam member, said control output means comprising two second rod members also pivoted to the respective walking-beam member, said control parameter input means comprising two adjustment members and common shaft means operatively connected to both adjustment members, said fork means being connected to said common shaft means for operation by at least one of said two adjustment members.

6. The mechanism of claim 5, further comprising bar means connecting said stop members, said bar means forming a stop element reaching into said wedge shaped space formed between the fork prongs.

7. The mechanism of claim 5, wherein said two walking-beam members comprise a common journal axle.

* * * * *